(12) United States Patent
Sato et al.

(10) Patent No.: US 9,651,113 B2
(45) Date of Patent: May 16, 2017

(54) SILENT CHAIN

(71) Applicant: TSUBAKIMOTO CHAIN CO., Osaka-shi, Osaka (JP)

(72) Inventors: Toshifumi Sato, Osaka (JP); Takeo Sasaki, Osaka (JP)

(73) Assignee: TSUBAKIMOTO CHAIN CO., Osaka (JP)

( * ) Notice: Subject to any disclaimer, the term of this patent is extended or adjusted under 35 U.S.C. 154(b) by 56 days.

(21) Appl. No.: 14/817,569

(22) Filed: Aug. 4, 2015

(65) Prior Publication Data

US 2016/0040752 A1  Feb. 11, 2016

(30) Foreign Application Priority Data

Aug. 6, 2014 (JP) .................... 2014-160840

(51) Int. Cl.
 *F16G 13/04* (2006.01)
 *F16G 13/08* (2006.01)
(52) U.S. Cl.
 CPC ............ *F16G 13/04* (2013.01); *F16G 13/08* (2013.01)
(58) Field of Classification Search
 CPC . F16G 13/04; F16G 5/18; F16G 13/08; B21L 15/005; F16H 9/18
 USPC ...................................................... 474/215
 See application file for complete search history.

(56) References Cited

U.S. PATENT DOCUMENTS

| | | | | |
|---|---|---|---|---|
| 2,324,640 A * | 7/1943 | Perry | ............... | F16G 13/04 474/215 |
| 3,742,776 A * | 7/1973 | Avramidis | ............... | F16G 13/04 474/215 |
| 4,130,026 A * | 12/1978 | Jeffrey | ............... | F16G 13/04 474/215 |
| 4,581,001 A * | 4/1986 | Rattunde | ............... | F16H 9/24 474/214 |
| 5,242,334 A * | 9/1993 | Sugimoto | ............... | F16G 5/18 474/215 |
| 5,372,554 A * | 12/1994 | Okuda | ............... | F16G 13/04 474/206 |
| 6,142,903 A * | 11/2000 | Heinrich | ............... | F16G 5/18 474/215 |
| 6,277,046 B1 * | 8/2001 | Ohara | ............... | F16G 13/04 474/215 |
| 6,387,003 B2 * | 5/2002 | Horie | ............... | B21L 15/005 474/212 |

(Continued)

FOREIGN PATENT DOCUMENTS

JP  2001-173732 A  6/2001
JP  2013-210035 A  10/2013

*Primary Examiner* — Henry Liu
(74) *Attorney, Agent, or Firm* — Westerman, Hattori, Daniels & Adrian, LLP

(57) ABSTRACT

An object of the present invention is to provide a silent chain which suppresses vibration and undulation while maintaining rigidity, strength, and durability and simplifying a shape of a pin hole without using a locker pin with a special shape and special material. In a silent chain 100, a guide row 101 made up of guide plates 110 and a middle plate 120 and a non-guide row made 103 made up of inner plates 130 are alternately connected in a chain longitudinal direction by a pair of locker pins 140 and 150. Pin holes 121 and 131 respectively have outer peripheral side straight portions 123 and 133 and inner peripheral side straight portions 124 and 134 which are formed parallel to each other.

5 Claims, 6 Drawing Sheets

(56) References Cited

U.S. PATENT DOCUMENTS

| | | | | |
|---|---|---|---|---|
| 6,478,704 | B1* | 11/2002 | Greiter | F16G 5/18 474/215 |
| 8,012,054 | B2* | 9/2011 | Morimoto | F16G 13/04 474/215 |
| 8,485,928 | B2* | 7/2013 | Adachi | F16G 13/04 474/215 |
| 8,617,017 | B2* | 12/2013 | Tada | F16G 5/18 474/215 |
| 8,998,758 | B2* | 4/2015 | Hamaguchi | F16G 13/08 474/212 |
| 8,998,759 | B2* | 4/2015 | Hamaguchi | F16G 13/04 474/215 |
| 2001/0004615 | A1* | 6/2001 | Horie | B21L 15/005 474/214 |
| 2002/0072444 | A1* | 6/2002 | Matsuno | F16G 13/04 474/215 |
| 2002/0091027 | A1* | 7/2002 | Scheufele | F16G 5/18 474/229 |
| 2008/0312020 | A1* | 12/2008 | Simonov | F16G 13/04 474/215 |
| 2009/0192000 | A1* | 7/2009 | Junig | F16G 13/04 474/215 |
| 2011/0065542 | A1* | 3/2011 | Adachi | F16G 13/04 474/215 |
| 2013/0165285 | A1* | 6/2013 | Hamaguchi | F16G 13/04 474/215 |
| 2013/0260934 | A1* | 10/2013 | Hamaguchi | F16G 13/04 474/215 |

* cited by examiner

Related Art

Related Art

Related Art

Related Art

SILENT CHAIN

BACKGROUND OF THE INVENTION

1. Field of the Invention

The present invention relates to a silent chain in which a guide row made up of a pair of left and right guide plates and a middle plate and a non-guide row made up of a plurality of inner plates are alternately connected in a chain longitudinal direction by a pair of locker pins.

2. Description of the Related Art

Conventionally, as shown in FIGS. 4 to 7, a silent chain 500 is known in which a guide row 501 made up of a pair of left and right guide plates 510 and a middle plate 520 and a non-guide row 503 made up of a plurality of inner plates 530 are alternately connected in a chain longitudinal direction by a pair of locker pins 504 made up of a long pin 540 and a short pin 550.

The long pin 540 is fitted and fixed to a pin hole 511 of the guide plate 510 and is seated on a pin seat portion 522 of a pin hole 521 of the middle plate 520, and does not rotate relatively.

The short pin 550 is seated on a pin seat portion 532 of a pin hole 531 of the inner plates 530 and does not rotate relatively.

Accordingly, when a rolling surface 541 of the long pin 540 and a rolling surface 551 of the short pin 550 come into direct contact with each other and roll, the guide row 501 and the non-guide row 503 bend.

When the silent chain 500 is in a straight state, as shown in FIG. 5, the rolling surface 541 of the long pin 540 and the rolling surface 551 of the short pin 550 come into contact with each other at a contact point T1 on a pitch line P and can roll both upward and downward as indicated by the arrows.

When the silent chain 500 is wound around a sprocket and bends toward an inner peripheral side (hereinafter, referred to as "forward bending"), as shown in FIG. 6, the rolling surface 541 of the long pin 540 and the rolling surface 551 of the short pin 550 roll so that a contact point T2 is displaced toward an outer peripheral side (upward).

When the silent chain 500 bends toward an outer peripheral side (hereinafter, referred to as "backward bending"), as shown in FIG. 7, the rolling surface 541 of the long pin 540 and the rolling surface 551 of the short pin 550 roll so that a contact point T3 is displaced toward an inner peripheral side (downward).

The pin hole 521 and the pin hole 531 are respectively formed in a circular shape with the exception of the pin seat portions 522 and 533. The pin hole 521 of the middle plate 520 does not restrict relative movement of the short pin 550 in any way during bending, and the pin hole 531 of the inner plates 530 does not restrict relative movement of the long pin 540 in any way during bending.

Therefore, during both forward bending and backward bending, the silent chain 500 can bend freely within a rollable range of the rolling surface 541 of the long pin 540 and the rolling surface 551 of the short pin 550.

As a result, a restricting member such as a chain guide or a tensioner must be provided in order to restrict bending of the silent chain 500 and suppress vibration and undulation in a free span during use.

Since such restricting members come into direct contact with the silent chain, there is a risk of the restricting members becoming a new source of sliding resistance and contact noise.

In order to solve the problem described above, a known technique restricts bending with a silent chain's own structure by applying bending resistance using an elastic deformation of a locker pin (refer to Japanese Patent Application Laid-open No. 2013-210035).

Another known technique suppresses vibration and undulation of a silent chain by providing bending restricting portions (a straight bending displacement allowing surface 46 and a straight reverse warping preventing surface 48) above and below a pin hole (refer to Japanese Patent Application Laid-open No. 2001-173732).

SUMMARY OF THE INVENTION

However, with the known technique disclosed in Japanese Patent Application Laid-open No. 2013-210035, the locker pin must be made of a material with rigidity that is low to some degree in order to cause the locker pin to elastically deform with respect to a pin hole. The requirement of a special locker pin that differs from the conventional creates a problem of increased production cost.

In addition, the locker pin requires rigidity, strength and durability when the silent chain is used for power transmission under a high load, and therefore increasing elastic deformation is difficult and vibration and undulation cannot be sufficiently suppressed.

Furthermore, there is also a risk of generating a different vibration in a chain tension direction attributable to the elastic deformation of the locker pin.

With the known technique disclosed in Japanese Patent Application Laid-open No. 2001-173732, since relative positions of a pin hole and one of the locker pins are fixed by pin position restricting surfaces (40 and 42) provided in the pin hole and a relative rolling range of the other locker pin is subsequently restricted by the bending restricting portions (the straight bending displacement allowing surface 46 and the straight reverse warping preventing surface 48), the pin position restricting surfaces (40 and 42) and the bending restricting portions (the straight bending displacement allowing surface 46 and the straight reverse warping preventing surface 48) cannot be formed into a continuous straight line. As a result, a shape of the pin hole becomes complicated.

In addition, in order to fix the locker pin to the pin hole with the pin position restricting surfaces (40 and 42), the locker pin must also be given a special sectional shape. Furthermore, in some cases, depending on a required allowable bending range, a shape of the locker pin itself must also be changed in order to continuously form the pin position restricting surfaces (40 and 42) and the bending restricting portions (the straight bending displacement allowing surface 46 and the straight reverse warping preventing surface 48) of the pin hole. This requirement for a special design creates a problem of increased production cost.

The present invention solves these problems and an object thereof is to provide a silent chain which suppresses vibration and undulation while maintaining rigidity, strength, and durability and simplifying a shape of a pin hole without using a locker pin with a special shape and special material.

A silent chain according to the present invention solves the problems described above by being configured as a silent chain in which a guide row made up of a pair of left and right guide plates and a middle plate disposed between the pair of left and right guide plates and a non-guide row made up of a plurality of inner plates are alternately connected in a chain longitudinal direction by a pair of locker pins to be inserted into a pair of front and rear pin holes provided on the middle plate and the inner plates, wherein the pair of front and rear pin holes of at least one of the middle plate and the inner plates has an outer peripheral side straight portion and an inner peripheral side straight portion, the outer peripheral side straight portion is formed in a flat surface shape that restricts, when being bent in a forward direction, movement of the locker pins toward an outer circumferential side of the bending, the inner peripheral side straight portion is formed in a flat surface shape that restricts, when being bent in a backward direction, movement of the locker pins toward an inner circumferential side of the bending, and the outer peripheral side straight portion and the inner peripheral side straight portion are formed parallel to each other.

With the invention according to present claim 1, since the pair of front and rear pin holes of at least one of the middle plate and the inner plates has an outer peripheral side straight portion and an inner peripheral side straight portion, the outer peripheral side straight portion is formed in a flat surface shape that restricts, when being bent in a forward direction, movement of the locker pins toward an outer circumferential side of the bending, the inner peripheral side straight portion is formed in a flat surface shape that restricts, when being bent in a backward direction, movement of the locker pins toward an inner circumferential side of the bending, and the outer peripheral side straight portion and the inner peripheral side straight portion are formed parallel to each other, a shape of the pin hole is simplified, and the outer peripheral side straight portion and the inner peripheral side straight portion can respectively restrict forward bending and backward bending and suppress vibration and undulation without using a locker pin with a special shape and a special material.

In addition, since a locker pin with a special shape and a special material need not be used, even when the silent chain is used for power transmission under a high load, a locker pin capable of readily securing required rigidity, strength, and durability can be adopted.

With the configuration according to present claim 2, due to the outer peripheral side straight portion being formed to be inclined with respect to a pitch line in a state where the silent chain is stretched linearly, since the locker pin that is relatively fixed to the pin holes can be designed not to abut the outer peripheral side straight portion, a gap or a tolerance between the locker pin and the pin holes can be set the same as in the case of a conventional pin hole that does not have an outer peripheral side straight portion nor an inner peripheral side straight portion. Therefore, there is no need to use a locker pin with a special shape or a special material and dimensional accuracy of the locker pin can be set the same as in the case of a conventional locker pin.

With the configuration according to present claim 3, due to the pairs of front and rear pin holes of both the middle plate and the inner plates each including the outer peripheral side straight portion and the inner peripheral side straight portion, since both of the pair of locker pins can be restricted by both pin holes, forward bending and backward bending can be restricted and vibration and undulation can be suppressed more reliably.

With the configuration according to present claim 4, due to the inner peripheral side straight portion of the middle plate and the inner peripheral side straight portion of the inner plates being provided so as to intersect each other as viewed from a side in a state where the silent chain is stretched linearly, since the locker pin that is relatively fixed to the pin holes can be designed not to abut the inner peripheral side straight portion, a gap or a tolerance between the locker pin and the pin holes can be set the same as in the case of a conventional silent chain. Therefore, there is no need to use a locker pin with a special shape or a special material and dimensional accuracy of the locker pin can be set the same as in the case of a conventional locker pin.

With the configuration according to present claim 5, due to the pairs of front and rear pin holes of both the middle plate and the inner plates each being formed in a shape that connects a plurality of arcs with different radii with the exception of the outer peripheral side straight portion, the inner peripheral side straight portion, and an engaging portion with the locker pins, the configuration can be applied to a silent chain including a locker pin that is designed for a long pin hole.

DESCRIPTION OF THE PREFERRED EMBODIMENTS

The present invention provides a silent chain in which a guide row made up of a pair of left and right guide plates and a middle plate disposed between the pair of left and right guide plates and a non-guide row made up of a plurality of inner plates are alternately connected in a chain longitudinal direction by a pair of locker pins to be inserted into a pair of front and rear pinholes provided on the middle plate and the inner plates, wherein the pair of front and rear pin holes of at least one of the middle plate and the inner plates has an outer peripheral side straight portion and an inner peripheral side straight portion, the outer peripheral side straight portion is formed in a flat surface shape that restricts, when being bent in a forward direction, movement of the locker pins toward an outer circumferential side of the bending, the inner peripheral side straight portion is formed in a flat surface shape that restricts, when being bent in a backward direction, movement of the locker pins toward an inner circumferential side of the bending, and the outer peripheral side straight portion and the inner peripheral side straight portion are formed parallel to each other. The silent chain can use a locker pin with an ordinary shape and made of an ordinary material. The silent chain can assume any specific embodiment as long as rigidity, strength, and durability are maintained and vibration and undulation are suppressed while simplifying a shape of the pin holes.

Any specific material may be used for the respective components of the silent chain according to the present invention as long as the material has sufficient strength to maintain tension of the chain at a proper level. From the perspectives of strength, workability, and economic efficiency, an iron-based material such as steel and cast iron is favorably used. In particular, the guide plates, the middle plate, and the inner plates are favorably formed by punching out steel plates.

Hereinafter, a silent chain according to an embodiment of the present invention will be described with reference to the drawings.

First Embodiment

Figure 4:
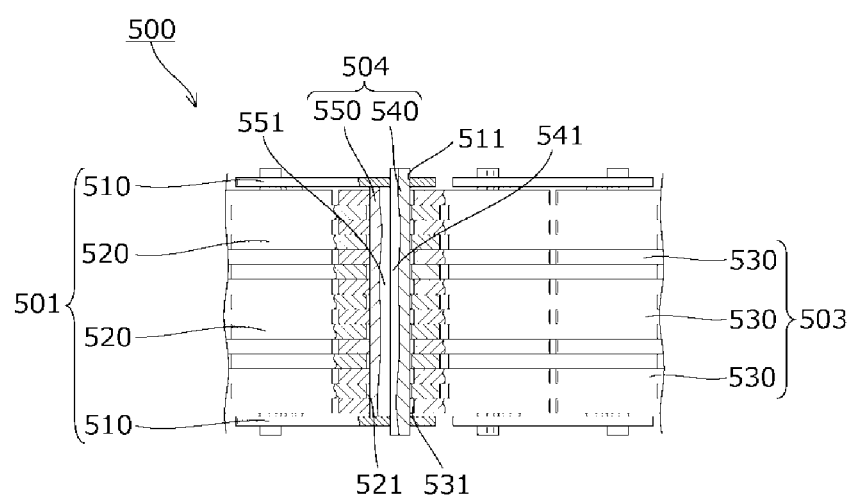
FIG. 4 is an explanatory diagram of a conventional silent chain.
Figure 5:
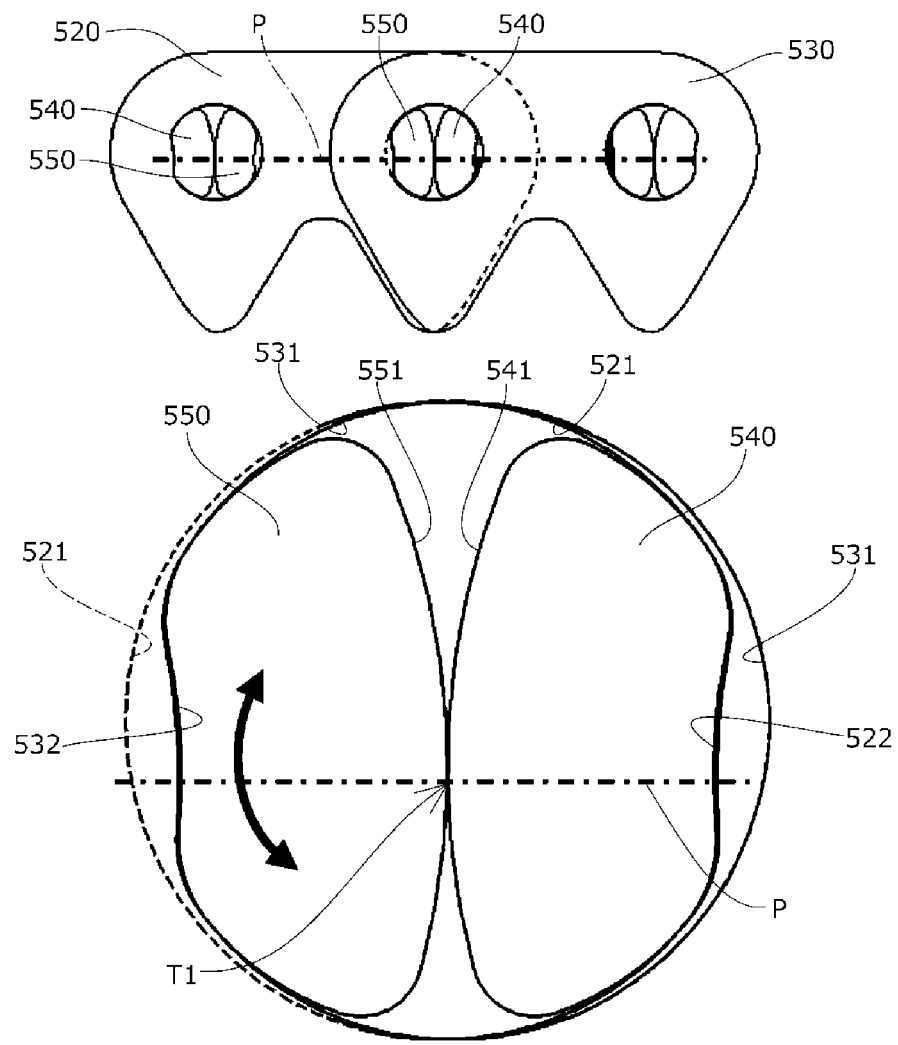
FIG. 5 is a relational diagram between a connecting pin and a pin hole when a conventional silent chain is in a straight state.
Figure 6:
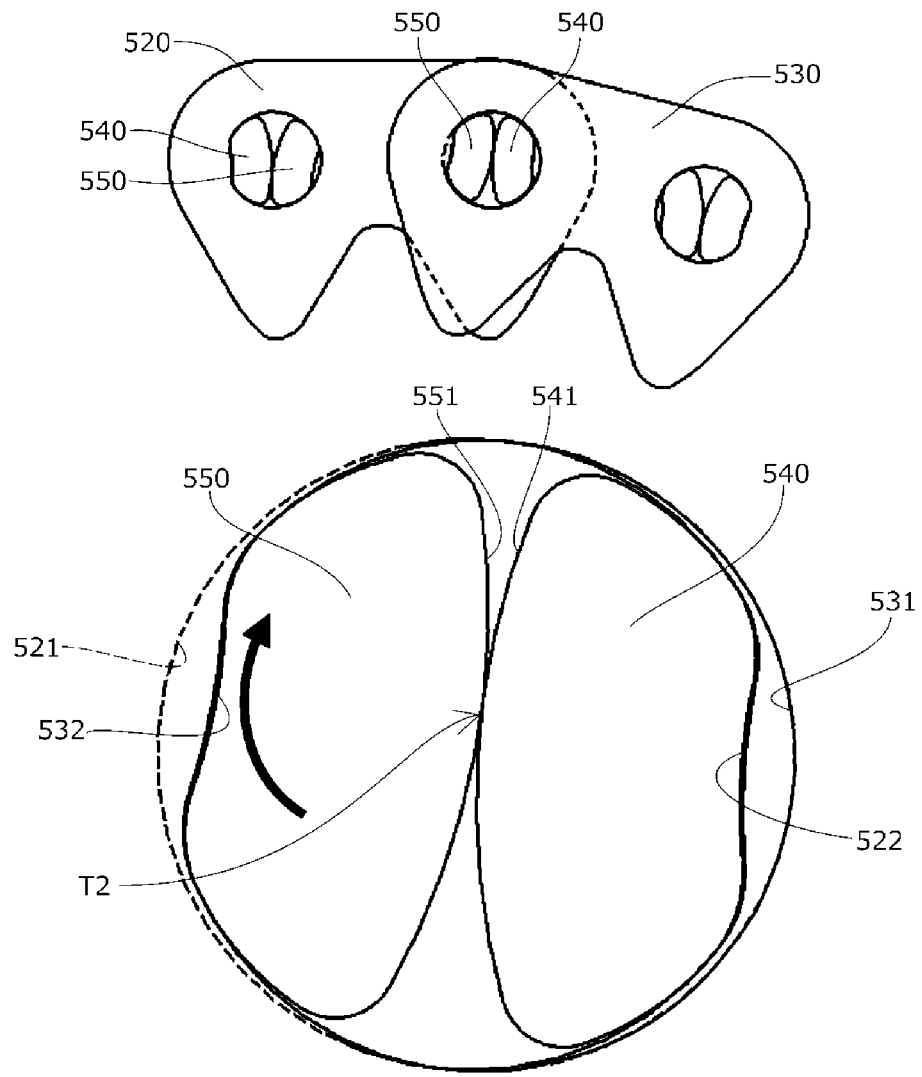
FIG. 6 is a relational diagram between a connecting pin and a pin hole during forward bending of a conventional silent chain.
Figure 7:
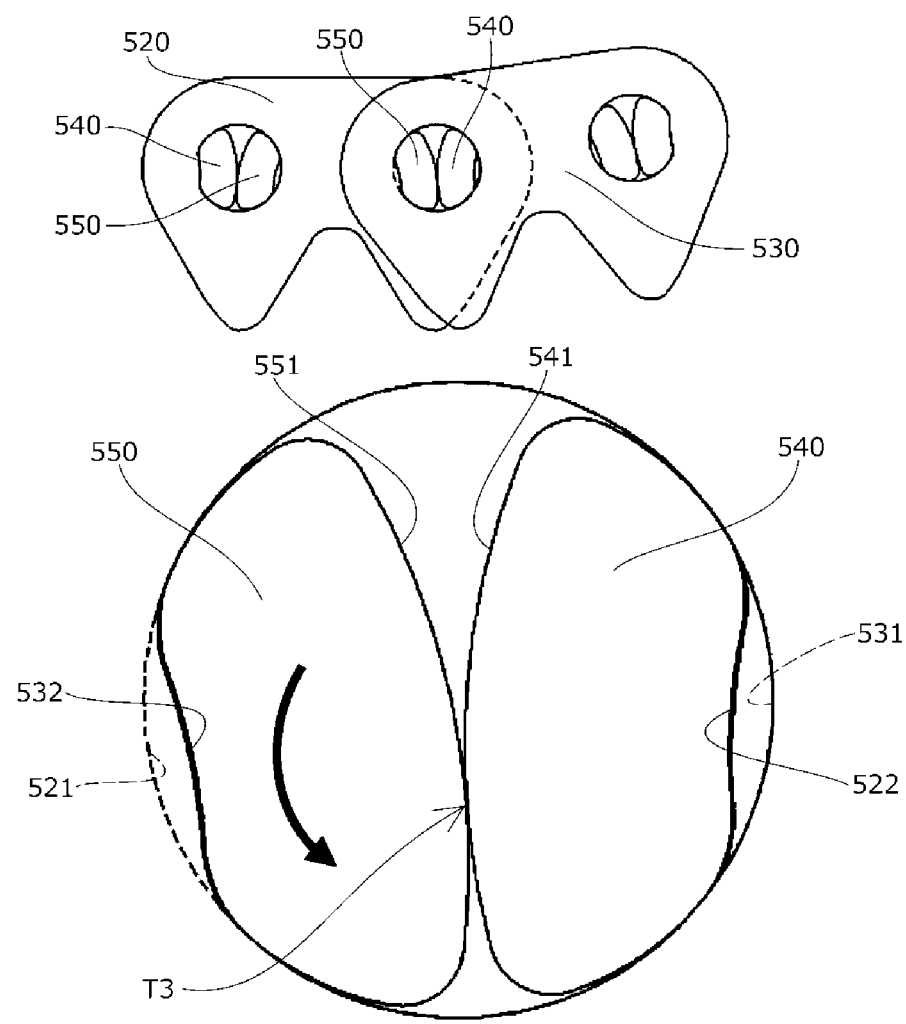
FIG. 7 is a relational diagram between a connecting pin and a pin hole during backward bending of a conventional silent chain.

A silent chain 100 according to a first embodiment of the present invention is similar to a conventional silent chain 500 shown in FIG. 4 with the exception of a shape of a pin hole 121 of a middle plate 120 and a pin hole 131 of an inner plate 130 (the silent chain 100 corresponds to a configuration in which reference numerals shown in FIG. 4 are replaced with reference numerals in the 100s).

Figure 1:
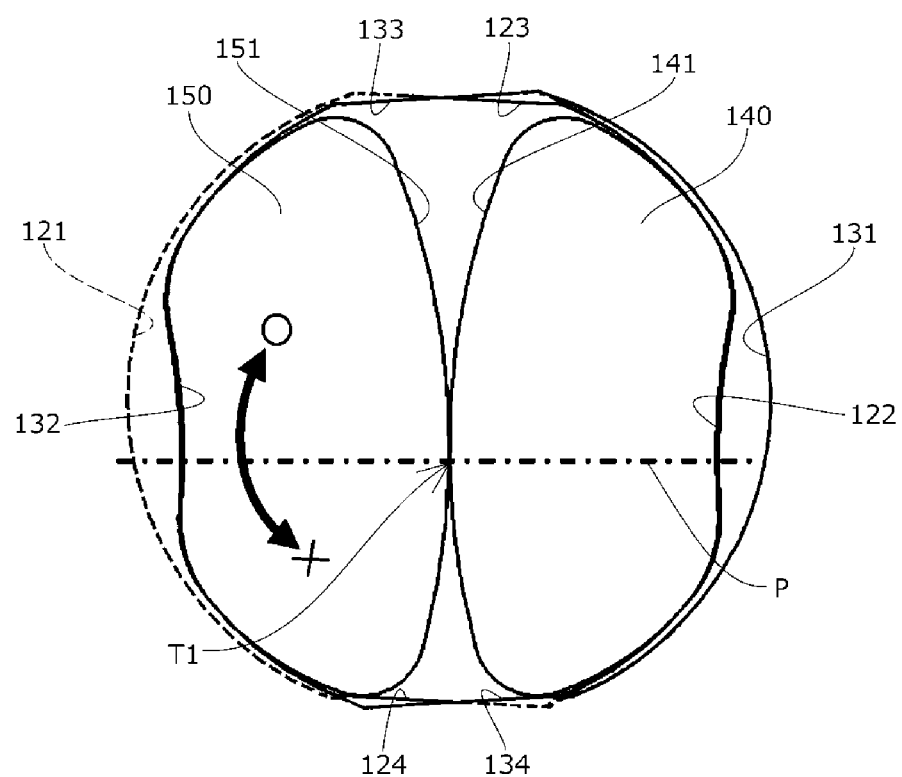
FIG. 1 is a relational diagram between a connecting pin and a pin hole when a silent chain according to a first embodiment of the present invention is in a straight state.
Figure 2:
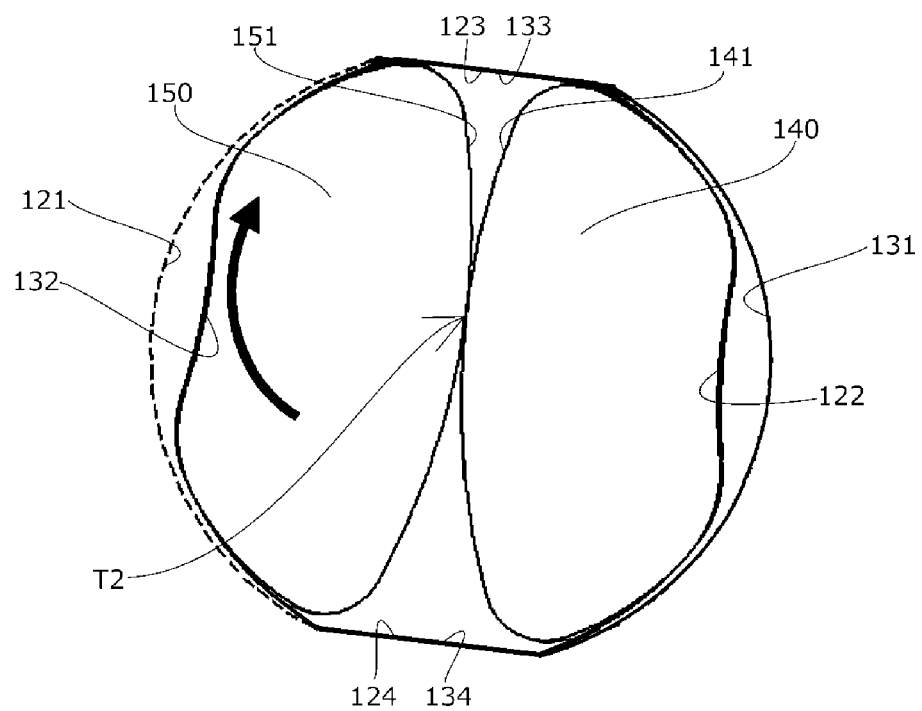
FIG. 2 is a relational diagram between a connecting pin and a pin hole during forward bending of a silent chain according to the first embodiment of the present invention.

As shown in FIGS. 1 and 2, the pin hole 121 of the middle plate 120 and the pin hole 131 of the inner plate 130 respectively include outer peripheral side straight portions 123 and 133 and inner peripheral side straight portions 124 and 134 that are formed in a flat surface shape. The outer peripheral side straight portions 123 and 133 and the inner peripheral side straight portions 124 and 134 are respective formed parallel to each other and in the same length.

As shown in FIG. 1, the inner peripheral side straight portion 124 of the pin hole 121 of the middle plate 120 is formed to abut a lowermost portion of a short pin 150 and the inner peripheral side straight portion 134 of the pin hole 131 of the inner plate 130 is formed to abut a lowermost portion of a long pin 140 when the silent chain 100 is in a straight state.

Accordingly, since bending is restricted in a direction in which an abutting point T1 of a rolling surface 141 of the long pin 140 and a rolling surface 151 of the short pin 150 falls below a pitch line P, backward bending in a free span is suppressed.

On the other hand, the outer peripheral side straight portion 123 of the pin hole 121 of the middle plate 120 is formed to be separated from an uppermost portion of the short pin 150 and the outer peripheral side straight portion 133 of the pin hole 131 of the inner plate 130 is formed to be separated from an uppermost portion of the long pin 140.

Accordingly, since bending is allowed in a direction in which the abutting point T1 of the rolling surface 141 of the long pin 140 and the rolling surface 151 of the short pin 150 rises above the pitch line P, forward bending from a straight state is allowed.

As shown in FIG. 2, when the silent chain 100 bends forward by a prescribed angle, the outer peripheral side straight portion 123 of the pin hole 121 of the middle plate 120 abuts the uppermost portion of the short pin 150 and the outer peripheral side straight portion 133 of the pin hole 131 of the inner plate 130 abuts the uppermost portion of the long pin 140.

Accordingly, since the abutting point of the rolling surface 141 of the long pin 140 and the rolling surface 151 of the short pin 150 is restricted from reaching higher than T2, an upper limit of forward bending can be restricted.

By setting the upper limit on the basis of forward bending when the silent chain is wound around a sprocket with a minimum radius, unnecessary forward bending in a free span is suppressed.

In the present embodiment, the pitch line P on which the abutting point T1 of the rolling surface 141 of the long pin 140 and the rolling surface 151 of the short pin 150 exists is designed to be lower than centers of the pin holes 121 and 131 when the silent chain 100 is in a straight state.

Therefore, although backward bending is restricted and forward bending is allowed in a straight state even when the outer peripheral side straight portions 123 and 133 and the inner peripheral side straight portions 124 and 134 are formed in the same length, the outer peripheral side straight portions 123 and 133 and the inner peripheral side straight portions 124 and 134 may be respectively formed in appropriate lengths in accordance with conditions such as a position of the pitch line P and a required angle of forward bending.

In addition, the outer peripheral side straight portion and the inner peripheral side straight portion may be provided only on one of the pin hole 121 of the middle plate 120 and the pin hole 131 of the inner plate 130.

Second Embodiment

A silent chain 200 according to the first embodiment of the present invention is similar to the conventional silent chain 500 shown in FIG. 4 with the exception of a sectional shape of a long pin 240, a sectional shape of a short pin 250, a shape of a pin hole 221 of a middle plate 220, and a shape of a pin hole 231 of the inner plate 230 (the silent chain 200 corresponds to a configuration in which reference numerals shown in FIG. 4 are replaced with reference numerals in the 200s).

Figure 3:
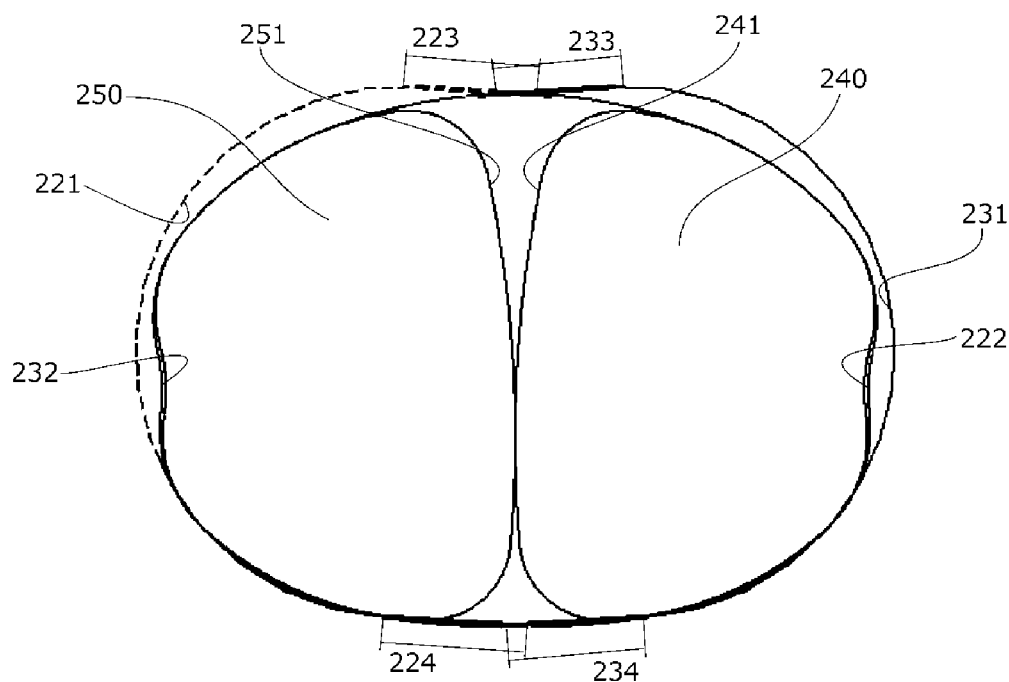
FIG. 3 is a relational diagram between a connecting pin and a pin hole when a silent chain according to a second embodiment of the present invention is in a straight state.

As shown in FIG. 3, the pin hole 221 of the middle plate 220 and the pin hole 231 of the inner plate 230 respectively include outer peripheral side straight portions 223 and 233 and inner peripheral side straight portions 224 and 234 that are formed in a flat surface shape. The outer peripheral side straight portions 223 and 233 and the inner peripheral side straight portions 224 and 234 are respective formed parallel to each other and in the same length.

In addition, the pin holes 221 and 231 are respectively formed in a shape that connects a plurality of arcs with different radii with the exception of the outer peripheral side straight portions 223 and 233, the inner peripheral side straight portions 224 and 234, and pin seat portions 222 and 232 which are engaging portions with the long pin 240 and the short pin 250.

In a similar manner to the first embodiment, among movements according to the present embodiment, backward bending is restricted and forward bending is allowed in a straight state, and unnecessary forward bending is restricted during forward bending. As a result, vibration and undulation in a free span are suppressed.

In addition, in the present embodiment, relative positions of the pin holes 221 and 231, the long pin 240, and the short pin 250 in a vertical direction can be changed with a movement of an abutting point of a rolling surface 241 of the long pin 240 and a rolling surface 251 of the short pin 250 during forward bending. Accordingly, a pitch length in a chain longitudinal direction can be changed in accordance with bending.

As a result, even in the case of bending within a restricted range, vibration and undulation can be suppressed by chain tension.

What is claimed is:

1. A silent chain in which a guide row made up of a pair of left and right guide plates and a middle plate disposed between the pair of left and right guide plates and a non-guide row made up of a plurality of inner plates are alternately connected in a chain longitudinal direction by a pair of locker pins to be inserted into a pair of front and rear pin holes provided on the middle plate and the inner plates, wherein the pair of front and rear pin holes of at least one of the middle plate and the inner plates has an outer peripheral side straight portion and an inner peripheral side straight portion, the outer peripheral side straight portion is formed in a flat surface shape that restricts, when being bent in a forward direction, movement of the locker pins toward an outer circumferential side of the bending, the inner peripheral side straight portion is formed in a flat surface shape that restricts, when being bent in a backward direction, movement of the locker pins toward an inner circumferential side of the bending, and the outer peripheral side straight portion and the inner peripheral side straight portion are formed parallel to each other.

2. The silent chain according to claim 1, wherein the outer peripheral side straight portion is formed to be inclined with respect to a pitch line in a state where the silent chain is stretched linearly.

3. The silent chain according to claim 1, wherein the pairs of front and rear pin holes of both the middle plate and the inner plates each include the outer peripheral side straight portion and the inner peripheral side straight portion.

4. The silent chain according to claim 3, wherein the inner peripheral side straight portion of the middle plate and the inner peripheral side straight portion of the inner plates are provided so as to intersect each other as viewed from a side in a state where the silent chain is stretched linearly.

5. The silent chain according to claim 1, wherein the pairs of front and rear pin holes of both the middle plate and the inner plates are each formed in a shape that connects a plurality of arcs with different radii with the exception of the outer peripheral side straight portion, the inner peripheral side straight portion, and an engaging portion with the locker pins.

* * * * *